United States Patent Office 2,823,069
Patented Feb. 11, 1958

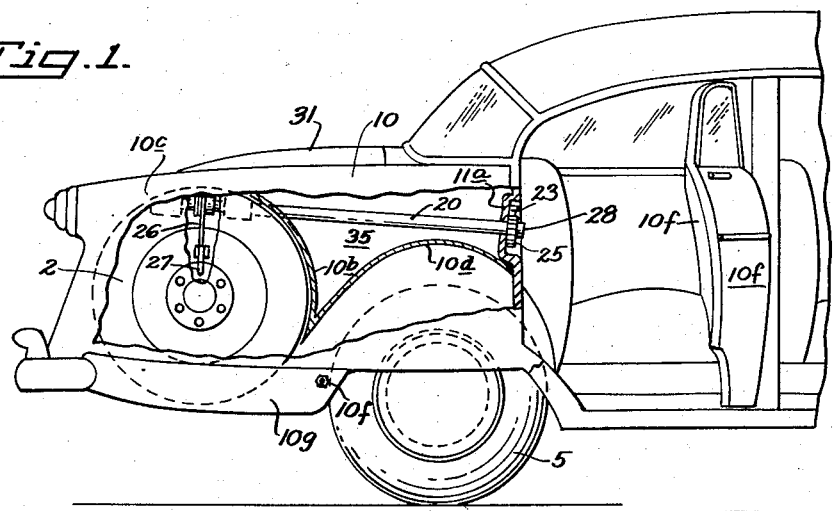
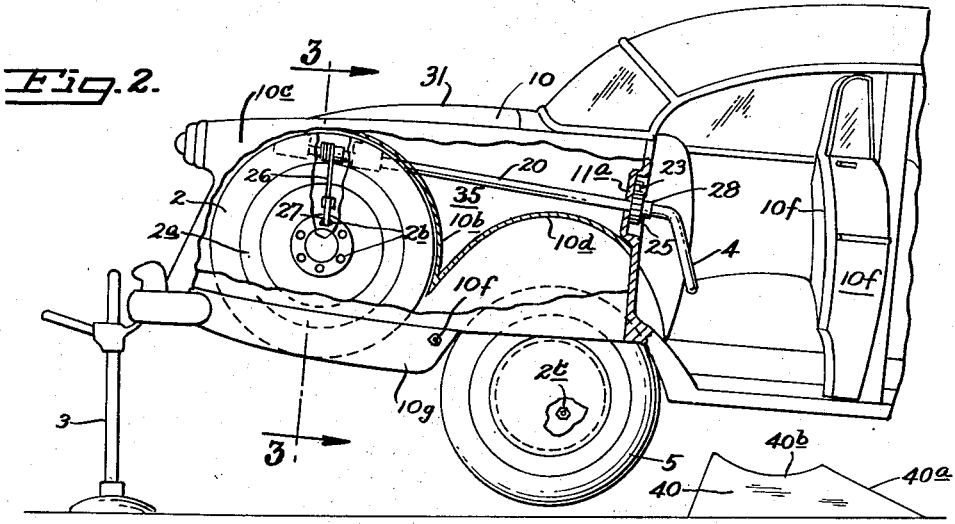
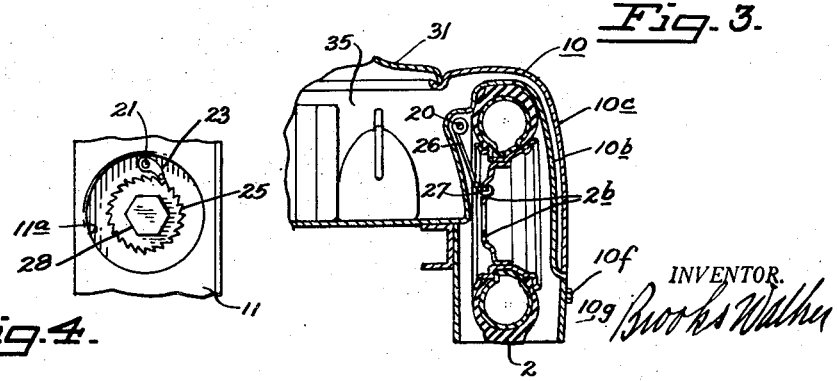

2,823,069

VEHICLE SPARE TIRE MOUNTING

Brooks Walker, Piedmont, Calif.

Application November 1, 1954, Serial No. 465,786

9 Claims. (Cl. 296—37.2)

This invention pertains to a mechanism for operating a spare tire and wheel into a recess in a vehicle adapted to receive said spare tire.

In my co-pending U. S. patent application, Ser. No. 314,265, entitled "Rear Fender Compartment,", now U. S. Patent No. 2,773,719, issued December 11, 1957, I have shown a spare nested in the body or fender extension rearwardly of one of the vehicle rear wheels in a recess accessible from below said recess.

This invention pertains to improvements in said recess and the means for retaining, raising, and lowering said spare into and out of said recess.

Another feature is to provide means for operating the mechanism for raising, retaining, or lowering said spare without disturbing the passengers in the vehicle or without removing or disturbing the luggage in the luggage compartment at the rear of the vehicle.

Another feature is to provide a means of operating said spare tire without requiring access to said luggage or engine compartment at the rear of the vehicle. The spare does not need to be clean or dry, and when changing a tire in the rain or mud the dirty or wet tire does not need to be placed in contact with the luggage as is usually the case. The spare is about the same distance from the longitudinal center of the vehicle so the fore and aft center of balance is about the same without lengthening the vehicle. The spare is accessible from the side of the road reducing the hazard to the tire changer from a rear end collision when changing a tire.

Another feature is to provide for removal of the spare tire by a removable skirt on the fender over the spare tire below the center of the spare tire.

By providing a mechanism that raises, lowers, and holds the spare operable from a recess in a door jamb, the spare cannot be removed when the doors are locked; the mechanism can be operated by opening the door and using the tire winch which eliminates extra cranks, etc. The mechanism operates whether the body is a two-door or four-door type or as long as it has a door on the same side as the spare tire recess. There is no chance of snagging the passengers' clothing when entering and leaving the vehicle. No change in the styling of the vehicle is necessary if there is enough room for the spare recess back of the rear wheels. Space usually wasted outside of the frame back of the rear wheel is utilized.

Other features will be more particularly pointed out in the accompanying specifications and claims.

I have illustrated my invention by way of example in the accompanying drawings, in which:

Fig. 1 is a side elevation partly cut away of the rear portion of a vehicle incorporating one form of the invention.

Fig. 2 is similar to Fig. 1 with the rear of the vehicle raised preparatory to removal of the spare.

Fig. 3 is a rear elevation section taken at Sec. 3—3 of Fig. 2, in the direction of the arrows showing the right rear portion only.

Fig. 4 is an enlarged view of the ratchet mechanism shown in Figs. 1 and 2, together with a cut away portion of the door jamb which supports same.

On all figures like numerals of reference refer to corresponding parts.

In Figs. 1 through 4 numeral 10 designates a vehicle body with portion 10c extending rearwardly and outside of the rear ground-engaging wheel 5. A wheel well 10d forms the housing or recess for rear wheel 5 and separates wheel 5 from the luggage or rear engine space 35. Another housing or recess 10b is formed rearwardly of the rear wheel 5 and is adapted to receive spare tire 2 which is mounted on spare wheel 2a which has the usual holes 2b for mounting bolts 2c.

The vehicle is raised on bumper jack 3 or any other type of jack or block under a vehicle wheel for removal of spare 2. This is accomplished as is shown in Fig. 2. The pawl 23 is pivoted on pin 21 which engages ratchet 25 which is secured to rod 20 on which cable 26 is wound to raise spare tire and wheel 2 by the engagement of hook 27 in one of the wheel bolt holes 2b to provide means whereby the spare wheel 2 may be raised and retained in the retracted positions shown in Figs. 1 and 2.

After the vehicle is lifted by the bumper jack, as shown in Fig. 2, spare 2 is disengaged by relieving the pressure on pawl 23 by the use of wheel wrench 4 engaging nut 28 which is secured to ratchet 25. After pawl 23 has been released, the wheel can be lowered by rotating wheel wrench 4 or by removing the wheel wrench and letting rod 20 spin freely to allow the spare to drop down against the roadway. Since it is a pneumatic tire it would not be hurt by dropping this distance to the roadway. Cable 26 and hook 27 can be disengaged from wheel bolt hole 2b after the tire reaches the roadway so that the spare may be used in the usual manner. The spare is replaced in the wheel well or housing 10b by reversing the operation. Engaging hook 27 in bolt hole 2b and winding up on wrench 4 while engaged to nut 28 will retract the tire until it is stopped by the wheel well 10b when in the positions shown in Figs. 1 and 2, and pawl 23 will retain it in this position.

A recess 11a in door jamb 11 nests pawl 23, ratchet 25, and nut 28 preferably below the usual surface of the door jamb and behind the edge of the door 10f.

In Fig. 2 we have shown the vehicle elevated on bumper jack 3. However, the bumper jack may be needed to lift one of the other wheels of the car which has a flat tire, and in order to avoid double lifting of the car to remove the spare a block 40 may be carried in the luggage compartment or under the hood or along the inside or outside of the frame and right rear wheel driven up on the ramp portion 40a of the block 40 until it rests in the concave portion 40b. This will raise the right rear portion of the vehicle sufficiently for the easy removal of the spare 2. While the right rear is so raised it will make it much easier to lift the right front as resistance of the rear springs to lifting the right front will be greatly reduced by the elevation of the right rear tire. If a wheel on the left side of the vehicle has a flat tire, the wheel on the left which is not flat can be run on the ramp 40a to recess 40b so that the bumper jack can lift the flat much more easily and retain more pressure on the road contacting wheel on the end of the vehicle being lifted than would be the case if block 40 were not used. If the right rear tire (or the tire in front of the spare wheel well) is flat, jacking the car on the bumper jack at the right rear or from a frame jack will allow removal of the spare and elevation of the flat tire in the one jacking operation so that the block 40 would not be needed under the rear wheels but would facilitate the jacking if the front wheel on the same side of the car were driven up the ramp to the top of block 40 prior to the jacking up of the rear portion of the vehicle to free the spare and elevate the flat.

As an alternate means of removing a spare tire without jacking up the rear portion of the vehicle, I have shown a fender skirt 10g which may be removable by bolt 10f or retained in any other suitable manner. With skirt 10g removed spare wheel 2 may be removed from spare tire well 10b without jacking up the vehicle or running it up on block 40.

In Fig. 3 I have shown the relationship of the spare tire 2 to the wheel well 10b, cable 26, hook 27, and rod 20. Luggage deck 31 covers luggage. Luggage is protected from dust and moisture by wheel well 10d and spare tire well 10b.

Where I refer to wheel bolts in this specification and claims, I wish the term to be inclusive to cover studs and nuts for retaining the rear wheels to their supporting structure or bolts or any other suitable mechanism for attaching the wheel to its supporting structure.

Where I say spare wheel, I mean spare tire and wheel, or spare tire and rim, or just spare tire.

From this construction it will be seen that I have provided a means whereby the spare tire may be accessible without opening the luggage compartment and exposing the luggage to possible inclement weather; to provide a means whereby the spare tire can be replaced when muddy and dirty without contact with the luggage; and a means whereby the spare tire can be raised and lowered by the use of standard equipment on the vehicle such as a wheel tire wrench operated in a recess in a door jamb at a height which is readily accessible to the vehicle operator. The operation of the wheel wrench in this position by an unauthorized person is prevented when the vehicle doors are locked. It does not unnecessarily disturb the passengers when the doors are unlocked. If my construction is applied to a two-door type body rod 20 is lengthened so that the ratchet 25 is recessed in the single door jamb. The same is true on a station wagon, panel, or other type of vehicle.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a vehicle having a body, a rear wheel, and a door structure including a door jamb, the improvement comprising in combination with said body of a housing in said body, said housing being disposed rearwardly of said rear wheel and in substantial alignment therewith, said housing being open at the bottom and of sufficient size to receive a spare wheel in substantially vertical position therein, mechanism for raising and lowering a spare wheel through the opening in a substantially vertical position, part of said mechanism being recessed in a rear vertical portion of said jamb, and means cooperating with said part of the mechanism permitting operation of said mechanism only when the door structure is open.

2. In a vehicle having a body, a rear wheel, a door structure including a door jamb, and a spare wheel, the improvement comprising in combination with said body of an open-bottomed housing in said body, said housing being disposed rearwardly of said rear wheel and in substantial alignment therewith, access to said housing being from below through the open-bottom thereof, said housing being of sufficient size to receive the major portion of a spare wheel passed through the open-bottom in a substantially vertical position, mechanism for controlling the passing of the spare wheel to the substantially vertical position and to retain the spare wheel in the housing in such position, said mechanism having a portion thereof recessed in said door jamb and handle means cooperating with said portion of said mechanism to operate said mechanism when said door structure is open.

3. The structure as set forth in claim 2, wherein said handle means comprises a wheel wrench, said wrench being that wrench which is used in securing the rear wheel to the vehicle.

4. A vehicle having a body, a rear wheel, a spare wheel a housing in said body rearwardly of and substantially directly behind said rear wheel and adapted to receive the spare wheel, access to said housing being from below the housing, a vehicle door having a jamb formed in said body, a recess in said jamb, mechanism for controlling the raising and lowering of said spare wheel in a substantially vertical position, said mechanism including a flexible element, a winch on which said flexible element is wound, means on said flexible element for engaging said spare wheel, threaded elements for securing said rear wheel to said vehicle, a wheel wrench adapted to fit said threaded elements, an extension of said mechanism adapted to fit said wrench so that said wrench can act as a crank to operate said winch and releasable mechanism located in the recess in said jamb and associated with said winch for retaining said winch in any predetermined rotational position to retain said spare wheel in a substantially vertical position in said housing.

5. A vehicle having a body, a rear wheel, a spare tire, a housing in said body, said housing being rearwardly of and substantially directly behind said rear wheel and adapted to receive said spare tire in a substantially vertical position, access to said housing being from below the housing, said body having a portion which covers a side of the spare tire as viewed from a side of the vehicle, said portion of the body being close to the housing with the part thereof nearest a roadway comprising a readily removable skirt, the top of said skirt being below the center of the spare tire when positioned in the housing, said spare tire being removable from the housing by lowering to ground contact when the skirt is removed.

6. A vehicle body having a rear wheel housing, a door structure, and a spare wheel housing, said spare wheel housing being open at the bottom thereof and disposed rearwardly of said rear wheel housing in substantial alignment therewith, access to said spare wheel housing being from below through the opening therein, said spare wheel housing being large enough to receive the major portion of a spare wheel assembly in a substantially vertical position, mechanism for passing a spare wheel assembly upwardly through the opening and for controlling the positioning of a spare wheel assembly in such substantially vertical position in the spare wheel housing, and means permitting operation of said mechanism only when the door structure is in an open position.

7. The structure as set forth in claim 6, wherein said body has a portion thereof extending over the spare wheel housing, that part of the body portion nearest a roadway being a movable skirt, and means permitting said skirt to be moved to a position permitting access to a spare wheel assembly in the spare wheel housing to facilitate the removal of the spare wheel assembly therefrom.

8. A vehicle body having a rear wheel housing and a spare wheel housing, said spare wheel housing being disposed rearwardly of said rear wheel housing and in substantial alignment therewith, said spare wheel housing being open at the bottom thereof with access thereto being from below through the opening therein, said spare wheel housing further being of sufficient size to receive a spare wheel in a substantially vertical position, said body having a portion thereof extending over the space wheel housing, that part of the body portion nearest a roadway being a movable skirt, means permitting said skirt to be moved to a position permitting access to a spare wheel in the spare wheel housing to facilitate removal of a spare wheel therefrom by lowering same to ground contact.

9. The structure as set forth in claim 8 wherein the upper portion of said skirt terminates below the upper one-third of a spare wheel when positioned in the spare wheel housing.

References Cited in the file of this patent

UNITED STATES PATENTS

| | | |
|---|---|---|
| 1,448,250 | Au-Miller | Mar. 13, 1923 |
| 2,365,792 | Wohlfield | Dec. 26, 1944 |
| 2,529,361 | Abbas | Nov. 7, 1950 |
| 2,631,007 | Copus | Mar. 10, 1953 |
| 2,647,012 | Walker | July 28, 1953 |
| 2,688,372 | Walker | Sept. 7, 1954 |
| 2,700,572 | Torrance | Jan. 25, 1955 |

FOREIGN PATENTS

| | | |
|---|---|---|
| 631,921 | Great Britain | Nov. 11, 1949 |